(12) United States Patent
Ota et al.

(10) Patent No.: US 9,515,501 B2
(45) Date of Patent: Dec. 6, 2016

(54) BATTERY CHARGER AND CHARGING TERMINAL STRUCTURE

(71) Applicant: SEIKO EPSON CORPORATION, Tokyo (JP)

(72) Inventors: Toshihiro Ota, Fujimi-machi (JP); Yoshiki Kinoshita, Suwa (JP); Akira Koyabu, Shiojiri (JP); Hiroki Godo, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 496 days.

(21) Appl. No.: 13/912,550

(22) Filed: Jun. 7, 2013

(65) Prior Publication Data
US 2013/0328523 A1 Dec. 12, 2013

(30) Foreign Application Priority Data
Jun. 8, 2012 (JP) .................................. 2012-130484

(51) Int. Cl.
*H02J 7/00* (2006.01)
(52) U.S. Cl.
CPC .................................. *H02J 7/0045* (2013.01)
(58) Field of Classification Search
CPC ..... H02J 7/0042; H02J 7/0044; H02J 7/0045
USPC .......................................... 320/107, 113–115
See application file for complete search history.

(56) References Cited

U.S. PATENT DOCUMENTS

| | | | | |
|---|---|---|---|---|
| 5,982,140 A * | 11/1999 | Toya | ..................... | H02J 7/0045 320/107 |
| 2009/0072784 A1* | 3/2009 | Erickson | ............... | H02J 7/0027 320/108 |
| 2009/0278495 A1* | 11/2009 | Kaye | ..................... | H02J 7/0044 320/114 |
| 2010/0176761 A1 | 7/2010 | Suzuki et al. | | |

FOREIGN PATENT DOCUMENTS

| | | |
|---|---|---|
| JP | 10-21966 A | 1/1998 |
| JP | 10-304581 A | 11/1998 |
| JP | 2003-299253 A | 10/2003 |
| JP | 2008-067521 A | 3/2008 |
| JP | 2008-236882 A | 10/2008 |
| JP | 2010-63318 A | 3/2010 |
| JP | 2011-091924 A | 5/2011 |
| JP | 2011-234514 A | 11/2011 |

* cited by examiner

*Primary Examiner* — Drew A Dunn
*Assistant Examiner* — Zixuan Zhou
(74) *Attorney, Agent, or Firm* — Hauptman Ham, LLP (57) ABSTRACT

The battery charger has a socket that is tubular, has a bottom, and accepts a rechargeable battery inserted to the socket. At least one side wall of the socket is an inclined surface that is inclined to the vertical when a bottom of the battery charger is placed on a horizontal surface. A charging terminal of the battery charger is disposed on this side wall.

18 Claims, 7 Drawing Sheets

BATTERY CHARGER AND CHARGING TERMINAL STRUCTURE

RELATED APPLICATION(S)

The instant application claims the benefit of Japanese patent application No. 2012-130484 filed Jun. 8, 2012, the entire disclosure of which is incorporated by reference herein.

BACKGROUND

1. Technical Field

The present disclosure relates to battery charger that charges rechargeable batteries, and a charging terminal structure for the battery charger.

2. Related Art

Japanese Unexamined Patent Appl. Pub. JP-A-H09-19069 teaches a battery charger that is used to charge a rechargeable battery and is built to prevent damage to the charging terminals of the battery charger in the event a foreign object falls into the space where the rechargeable battery is inserted for charging. To prevent a foreign object from contacting the charging terminals of the battery charger, the battery charger disclosed in JP-A-H09-19069 has the charging terminals disposed in the top-most part of a shallow storage space configured to hold a flat rechargeable battery.

The shape of the portion where the rechargeable battery is installed in the battery charger may be shaped in various ways to accommodate batteries of different shapes and facilitate installing and removing a battery from the charger. For example, a battery charger that charges box-shaped or rectangular batteries may be built with a pocket-like socket unit to facilitate installing a battery. Disposing the charging terminals inside the socket in such a charger has the advantage of protecting the terminals because the terminals are not exposed on the outside of the charger. On the other hand, when liquid or a foreign object gets into the charging socket of such a battery charger, the liquid may contact the charging terminals. Constructing a battery charger so that a battery can be easily installed and the charging terminals can also be protected from liquids and other foreign objects is thus not simple.

SUMMARY

A battery charger according to some embodiments of the invention has a battery charger case, a socket and a charging terminal. The battery charger case has a top and a bottom. The socket is tubular and has a bottom, a top opening through which a rechargeable battery is insertable into the socket, and a side wall that extends between the top opening and the bottom and is a slope inclined to the vertical when the bottom of the battery charger case is placed on a horizontal surface. The charging terminal is disposed on this slope.

Note that "tubular" as used herein is not limited to a round section, and includes other sectional shapes including, but not limited to, rectangles and other polygons, ovals, and shapes combining angles and curved surfaces.

Some embodiments of the invention provide a charging terminal structure of a battery charger, including: a socket and a charging terminal. The socket is configured to be disposed in a battery charger case having a top and a bottom. The socket is tubular has a bottom, a top opening through which a rechargeable battery is insertable into the socket, and a side wall that extends between the top opening and the bottom and is a slope inclined to the vertical when the bottom of the battery charger case is placed on a horizontal surface. The charging terminal is disposed on the slope.

In some embodiments, a battery charger comprises a battery charger case and a plurality of sockets disposed in the battery charger case. The battery charger case has a top and a bottom. The top includes a plurality of inclined steps. Each of the sockets has a bottom, a top opening which is formed at a corresponding one of the inclined steps and through which a rechargeable battery is insertable into the socket, a side wall that extends between the top opening and the bottom and is a slope inclined to the vertical when the bottom of the battery charger case is placed on a horizontal surface, and a charging terminal disposed on the slope.

DESCRIPTION OF EMBODIMENTS

At least one embodiment of the present invention is described below with reference to the accompanying figures.

Figure 1:
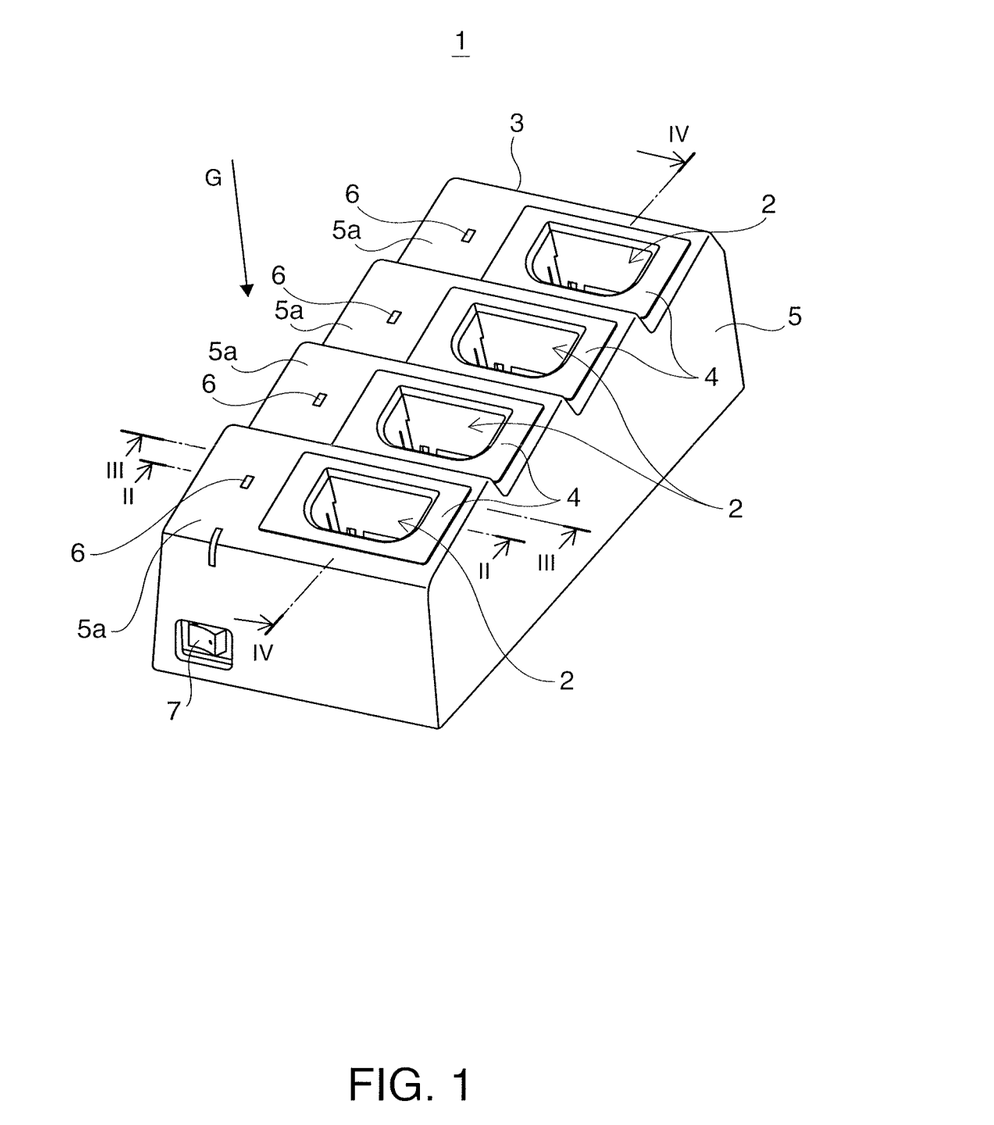
FIG. 1 is a perspective view of a battery charger according to some embodiments of the invention.

FIG. 1 is a perspective view of a battery charger according to some embodiments of the invention.

The battery charger 1 shown in FIG. 1 is a device for charging one or more rechargeable batteries, which are rechargeable storage batteries, installed in the battery charger 1. The battery charger 1 has a basically box-shaped case (battery charger case) 3 with a plurality of charging sockets 2 disposed in the top of the case 3. A rechargeable battery can be inserted to each of the charging sockets 2. The battery charger 1 according to at least one embodiment of the invention has four charging sockets 2, and can charge four batteries simultaneously when a rechargeable battery is installed in each charging socket 2.

More specifically, the case 3 includes four battery holders 4 (battery holding units) forming the charging sockets 2, and a battery holder frame 5. The top of the battery holder frame 5 has four mutually parallel inclined steps 5a, and a battery holder 4 is fit into each inclined step 5a. The inclined steps 5a slope down toward the front of the battery holder frame 5. The top open edge of each charging socket 2, and the top of each battery holder 4, is flush with the inclined step 5a.

An indicator 6 that indicates the charge state of the rechargeable battery installed to the corresponding battery holder 4 is disposed beside each battery holder 4 in the inclined step 5a. A power switch 7 for turning charger power on and off is disposed at the front face of the battery holder frame 5.

Note that FIG. 1 to FIG. 4 show the battery charger 1 when sitting on a horizontal surface. Down arrow G in FIG. 1, FIG. 2, and FIG. 4 indicates the direction of the vertical to the horizontal surface on which the battery charger 1 sits.

Figure 2:
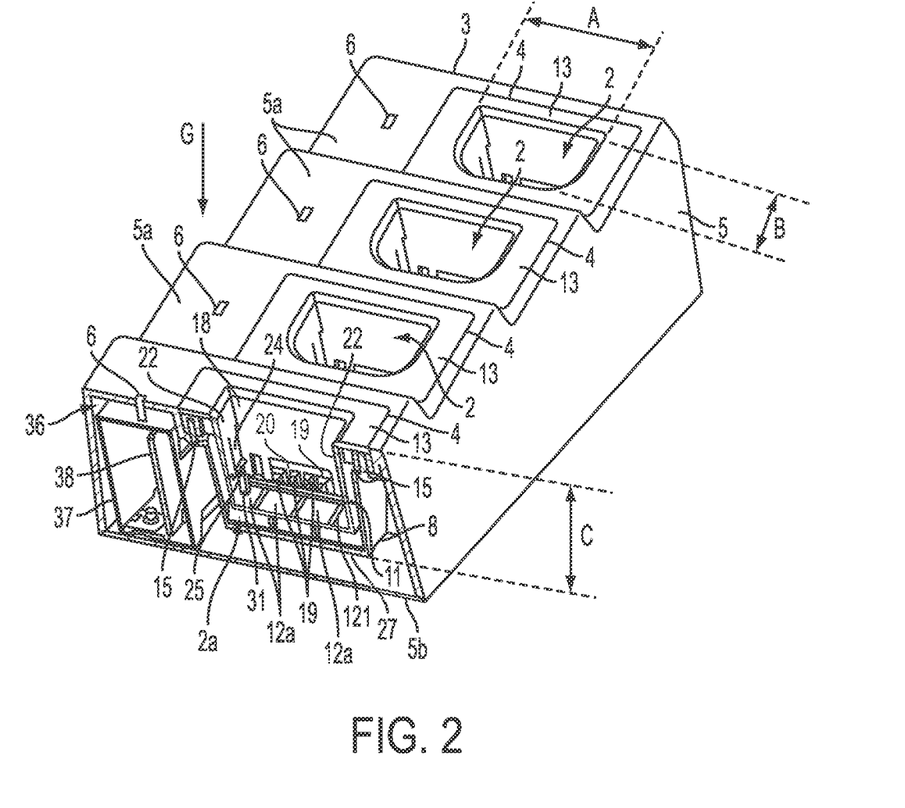
FIG. 2 is a perspective view with a section view through line II-II in FIG. 1.
Figure 3:
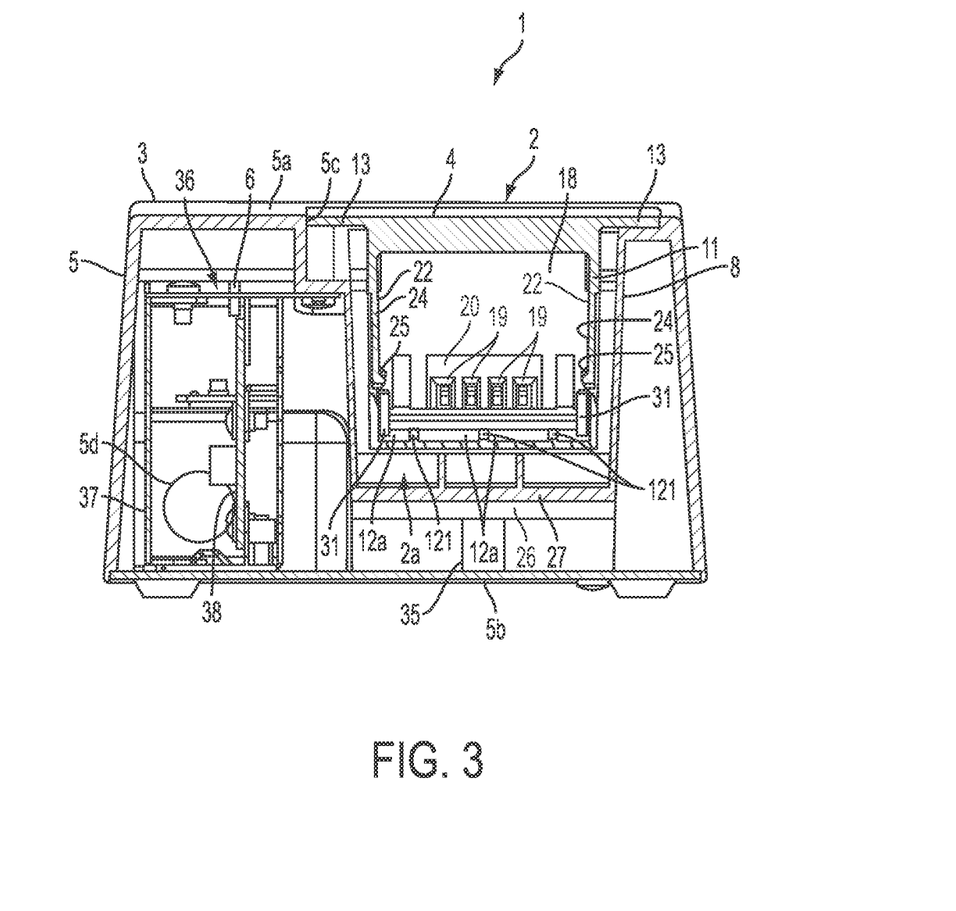
FIG. 3 is a section view through line III-III in FIG. 1.

FIG. 2 is a perspective view with a section view through line II-II in FIG. 1. FIG. 3 is a section view through line III-III in FIG. 1, and FIG. 4 is a section view through line IV-IV in FIG. 1.

Figure 4:
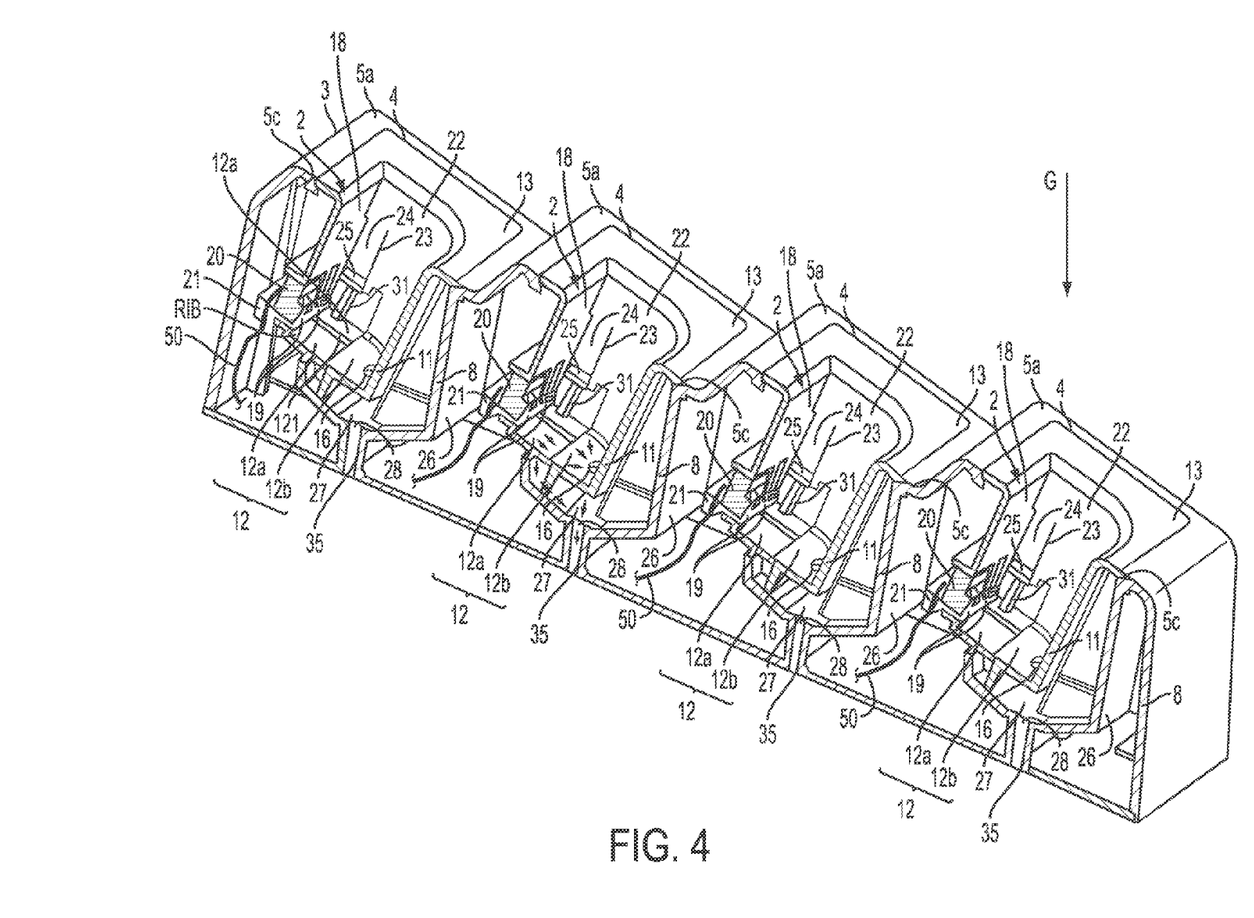
FIG. 4 is a section view through line IV-IV in FIG. 1.

As shown in FIG. 2 to FIG. 4, the battery holder frame 5 is a hollow rectangular body with a flat bottom 5b. A battery holder insertion opening (top opening) 5c is formed in each inclined step 5a of the battery holder frame 5, and a cup-shaped battery holder 4 is inserted from above and secured in each battery holder insertion opening 5c.

Each battery holder 4 includes a cylindrical part 11, a bottom 12 closing the inside end of the cylindrical part 11, and a flange 13 around the open end of the cylindrical part 11. The cylindrical part 11 and bottom 12 thus form a closed-bottom, cylindrical charging socket 2. The flange 13 is fastened with screws 15 to a liquid receptacle 8 described below that extends from the edge part of the battery holder insertion opening 5c.

Note that when viewed in section, the cylindrical part 11, that is, the charging socket 2, is substantially rectangular in this embodiment, and the widthwise ends of one long side are curved, but the disclosure is not so limited. More specifically, the cylindrical part 11, or charging socket 2, can be shaped as desired to match the shape of the rechargeable battery, and may be polygonal, round, or a desirable combination of such shapes.

As shown in FIG. 4, the bottom 12 of the battery holder 4 forming the bottom 2a of the charging socket 2 is inclined, sloping toward the front of the battery charger 1, and a drain hole 16 is opened at the front end of the bottom 2a at the lowest point inside the charging socket 2. The slope of the bottom 12 is less steep than the slope of the back wall 18 on which the charging terminals 19 are disposed. The bottom 2a (bottom 12) has two levels in the front-back direction of the battery charger 1 with the bottom back portion 12a located closer to the back of the battery charger 1 slightly lower than the bottom front portion 12b located toward to the front of the battery charger 1. One or more ribs 121 are formed on the bottom back portion 12a. A slit (not shown) is formed between the bottom back portion 12a and the bottom front portion 12b for permitting liquid on the bottom back portion 12a to flow through the slit down to a collection tray 27 (described in detail later) located below the bottom front portion 12b, as indicated by arrows in FIG. 4.

The back end of the bottom back portion 12a extends to the outside of the cylindrical part 11, and disposed at this extension are a support member 20 that supports the charging terminals 19 disposed inside the charging socket 2, and a wiring connector 21 that is electrically connected to the charging terminals 19. The charging socket 2 extends down substantially perpendicularly to the inclined step 5a, and the charging socket 2 therefore extends down at an angle when installed in the battery charger 1. The sides of the charging socket 2 are therefore inclined to the vertical G.

When the battery charger 1 is placed on a horizontal surface as shown in FIG. 1 to FIG. 4, the back wall 18 of the charging socket 2, which is the side towards the back of the battery charger 1, is a surface that faces down and is inclined to the vertical G when the bottom of the case 3 is placed on a horizontal surface. The opposite wall on the side towards the front of the battery charger 1 is also inclined to the vertical G but faces up. The charging terminals 19 are disposed at the bottom end of the back wall 18. The charging terminals 19 contact the terminals (described below) of the rechargeable battery inserted to the charging socket 2 to supply power for charging the battery.

Preferably, as illustrated in FIG. 2, the depth C of the charging socket 2 is greater than the length B of the short side of the opening 5c of the charging socket 2, and the charging terminals 19 are disposed below the middle of the depth of the charging socket 2, i.e., when the bottom of the case 3 is placed on a horizontal surface, the opening 5c is completely above the charging terminals 19. Further preferably, the depth C of the charging socket 2 is greater than the length A of the long side of the opening 5c of the charging socket 2. In this implementation with the charging terminals 19 disposed at a position remote from the open side of the charging socket 2, touching the charging terminals 19 from the outside of the battery charger 1 is difficult, and foreign objects can be more reliably prevented from contacting the charging terminals 19.

An arm 24 is formed on each of the side walls 22 formed on opposite sides of the charging socket 2. The arms 24 are formed towards the back inside the charging socket 2 separated from the drain hole 16 located at the front of the charging socket 2.

A substantially U-shaped slit 23 is formed in each side wall 22, and the arms 24 are thus formed as part of the side wall 22. Each arm 24 extends in the depth direction of the charging socket 2, the top is continuous to the side wall 22, and a claw 25 (engaging part) is formed protruding to the inside of the cylindrical part 11 at the bottom end of each arm 24.

A rib 31 extends in the depth direction of the charging socket 2 between the bottom back portion 12a and the side wall 22. Each rib 31 is separated a specific distance from the back wall 18, and extends parallel to the back wall 18 with the top end near the claw 25.

Inside the case 3 and outside of the battery holder 4, the liquid receptacle 8 is formed in unison with the battery holder frame 5. The liquid receptacle 8 has a collection tray 27 located below the bottom front portion 12b. The collection tray 27 is directly below the drain hole 16 opened in the bottom front portion 12b so that liquid flowing through the drain hole 16 is received by the collection tray 27.

The collection tray 27 is basically funnel-shaped with a lower middle portion, and a bottom drain 28 opened in the bottom or proximally thereto. A spout (e.g., a drain spout) 35 extending below the liquid receptacle 8 communicates with the bottom drain 28, the bottom end of the spout 35 communicates with the exterior through the bottom of the battery holder frame 5. The spout 35 thus connects the bottom drain 28 to the outside of the battery holder frame 5.

As a result, if liquid enters from the top opening of the charging socket 2, the liquid drains out from the drain hole 16 opened in the bottom front portion 12b and enters the collection tray 27. Liquid flowing into the collection tray 27 drains from the bottom drain 28 out through the spout 35 to the outside of the battery holder frame 5. As a result, liquid entering the charging socket 2 rapidly drains to the outside of the battery charger 1.

The liquid receptacle 8 has a divider 26 that extends up from the front edge of the collection tray 27, and this divider 26 divides the inside of the battery holder frame 5 into front and back portions. As shown in FIG. 4, this embodiment of the invention has four liquid receptacles 8 corresponding to the individual battery holders 4, and the space below battery holders 4 adjacent front and back is divided by the divider 26 of each liquid receptacle 8. As a result, if liquid enters any particular charging socket 2, the liquid is drained to the outside of the battery charger 1 without spreading to the space below another charging socket 2.

The drain hole 16 open in the bottom front portion 12b, and the bottom drain 28 open in the collection tray 27, may be at different positions horizontally. More specifically, the bottom drain 28 does not need to be directly below the drain hole 16. Because the drain hole 16 is not in a direct line (i.e., not aligned) with the spout 35 in this implementation, it is difficult to pass a rod-like foreign object, for example, from the bottom of the battery holder frame 5 through the spout 35 and the drain hole 16 into the inside of the charging socket 2.

Further preferably, as shown in FIG. 4, the sides of the collection tray 27 widthwise to the battery charger 1 form a valley, the bottom drain 28 opens into this valley, and the drain hole 16 is located above the valley. As a result, liquid flowing from the drain hole 16 into the collection tray 27 reaches the bottom drain 28 more quickly and is drained to the outside.

As described above, there is a space around the liquid receptacle 8 inside the battery holder frame 5. As shown in FIG. 2 and FIG. 3, a circuit board chamber 36 is formed inside the battery holder frame 5 beside the liquid receptacle 8. The circuit board chamber 36 is a space that extends in the front-back direction of the battery charger 1, and is substantially separated from the space where the liquid receptacle 8 is formed. A long circuit board 38 that extends from the front to the back of the battery holder frame 5, and a box-like circuit board case 37 that holds the circuit board 38, are disposed in the circuit board chamber 36. A power supply circuit (not shown in the figure) that supplies charging power to the charging terminals 19 disposed in each charging socket 2, and controls the power supplied to the charging terminals 19 according to the charge state of the rechargeable battery, is mounted on the circuit board 38. A power cord (not shown in the figure) that passes from outside the battery charger 1 through an opening 5d formed in the back wall of the battery charger 1 is connected to the circuit board 38, and power is supplied through this power cord to the power supply circuit.

A plurality of LEDs (not shown in the figure) that turn on/off as controlled by the power supply circuit are disposed along the top edge of the circuit board 38 at positions corresponding to each charging socket 2. Each LED is directly below a corresponding indicator 6, and light from the LED is guided to the top of the battery charger 1 by the indicator 6, which is made of transparent plastic.

Wiring 50 connected to the charging terminals 19 is connected to the circuit board 38 to supply power to the charging terminals 19 as described above. The wiring 50 passes from the circuit board 38 through the internal space of the battery holder frame 5 to a wiring connector 21 disposed in the bottom back portion 12a of each charging socket 2 as shown in FIG. 4. More specifically, the wiring 50 passes below the battery holder 4 and below the collection tray 27, and rises and is connected to the wiring connector 21 at the back of the battery holder 4.

Because liquid that enters the charging socket 2 flows down into the collection tray 27, passes from the bottom drain 28 through the spout 35, and is discharged to the outside of the battery charger 1 as described above, the wiring 50 does not contact the liquid, and the wiring 50 is protected from unwanted fluids.

The shape of a rechargeable battery that is installed in and charged by the battery charger 1 is described next.

Figure 5:
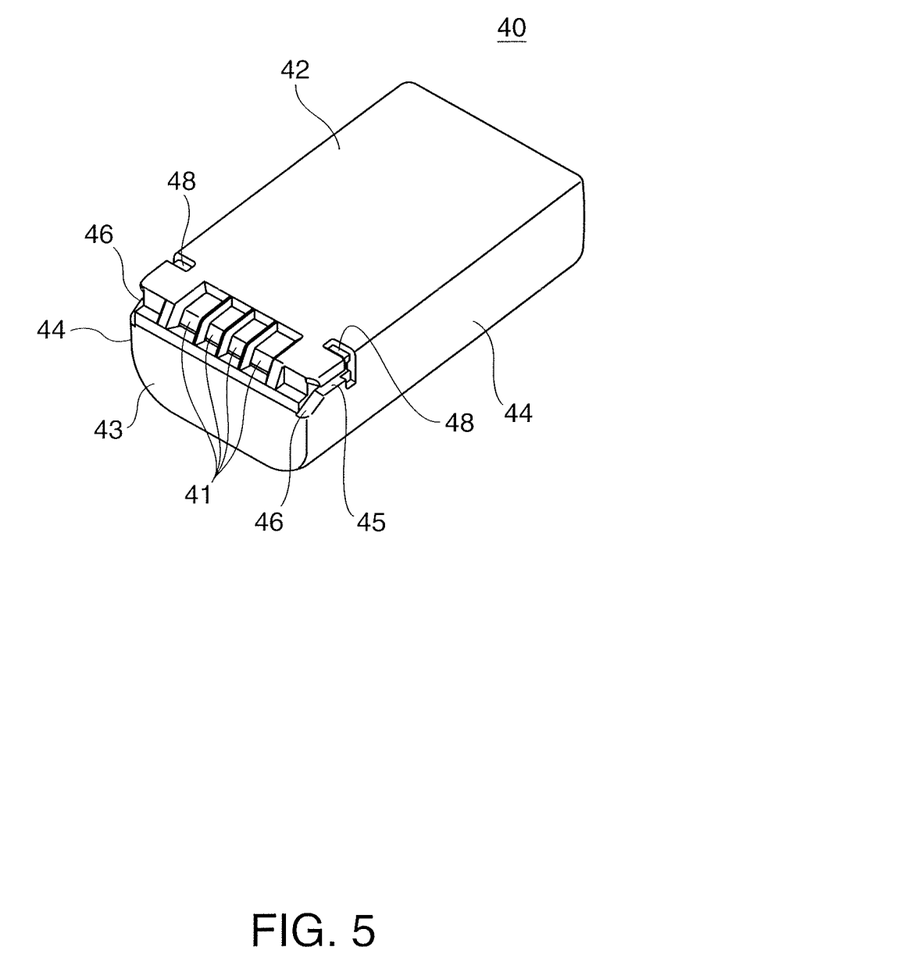
FIG. 5 is a perspective view of a rechargeable battery, in accordance with some embodiments.

FIG. 5 is a perspective view of a rechargeable battery 40, in accordance with some embodiments.

As shown in FIG. 5, the rechargeable battery 40 has a basically rectangular box-like case that holds a storage battery inside. The shape of the charging socket 2 conforms to the shape of the rechargeable battery 40 in section, and the rechargeable battery 40 is therefore installed in the battery charger 1 by inserting one of the long ends into a charging socket 2.

For convenience below, the side of the rechargeable battery 40 at the front in FIG. 5 is the bottom 43, the side shown on top in the figure is the back 42, and the shown side adjacent to the back 42 is side 44. The rechargeable battery 40 is inserted to the charging socket 2 with the bottom 43 down.

The rechargeable battery 40 has battery terminals 41 disposed where the back 42 and bottom 43 meet. When the rechargeable battery 40 is inserted in the charging socket 2, the battery terminals 41 make electrical contact with the charging terminals 19 (FIG. 2).

Straight channels 45 extending from the bottom 43 are formed in the sides 44 on opposite sides of the width of the rechargeable battery 40. While not shown in FIG. 5, a channel 45 is formed in each of the pair of sides 44. A bevel 46 creating a wide opening is formed on the bottom 43 side edge of each channel 45. A catch channel 48 extending in the thickness direction of the rechargeable battery 40 is formed at the top end of each channel 45.

Figure 6:
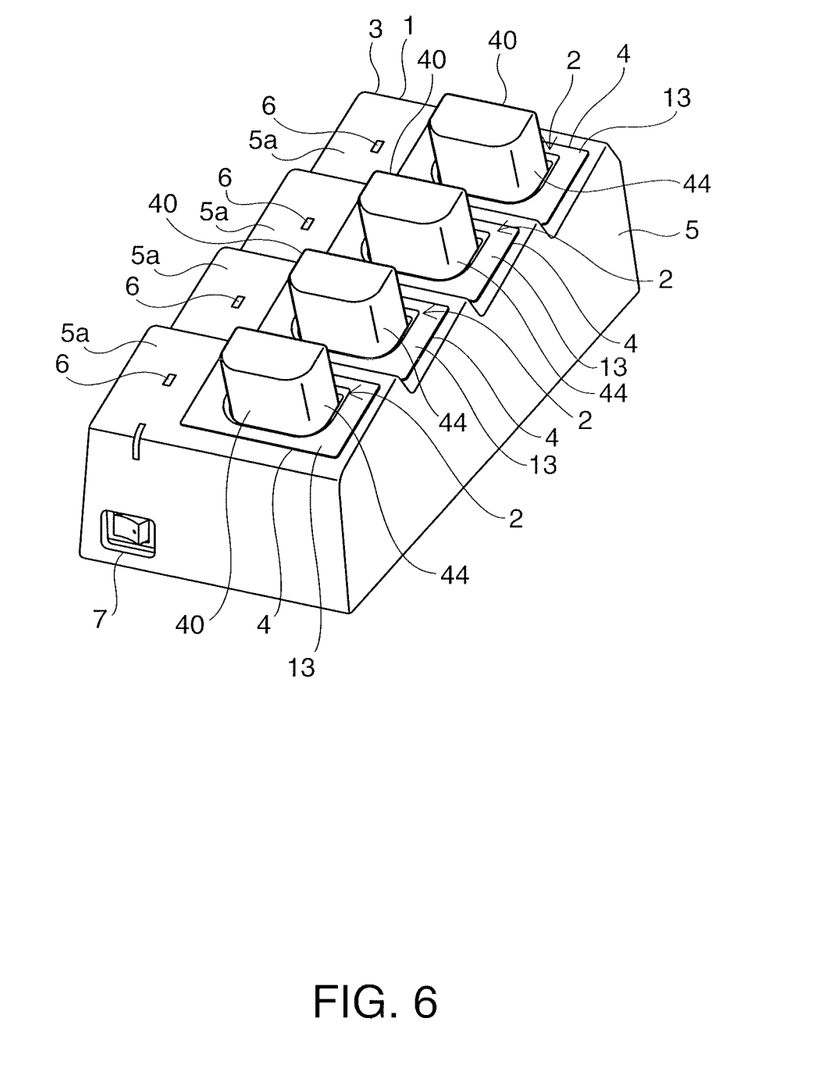
FIG. 6 is a perspective view of the battery charger with rechargeable batteries installed, in accordance with some embodiments.
Figure 7:
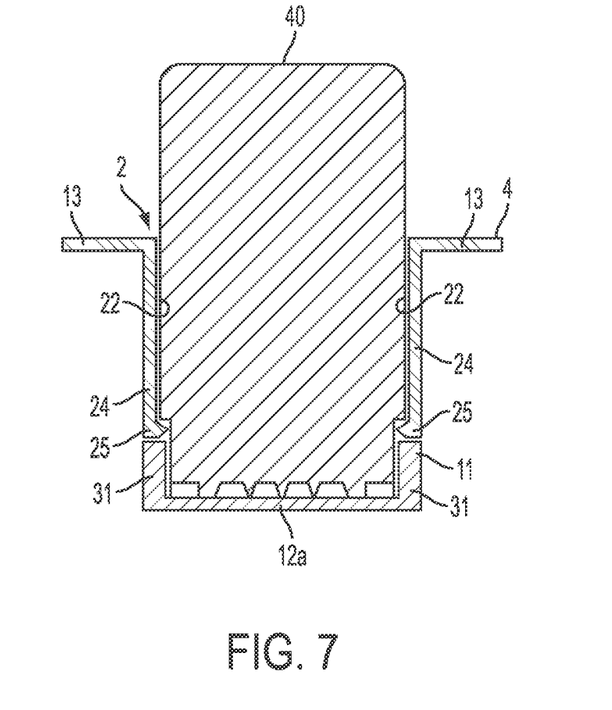
FIG. 7 is a section view showing a rechargeable battery when stored in the battery charger, in accordance with some embodiments.

FIG. 6 is a perspective view of the battery charger 1 when a rechargeable battery 40 is installed in each charging socket 2, and FIG. 7 is a section view of the battery holder 4 when a rechargeable battery 40 is installed in the charging socket 2, in accordance with some embodiments.

As shown in FIG. 6 and FIG. 7, the rechargeable battery 40 is inserted to the charging socket 2 with the back 42 facing the back wall 18 of the charging socket 2. When the rechargeable battery 40 is fully inserted to the charging socket 2, the claws 25 engage the catch channels 48 in the rechargeable battery 40 as shown in FIG. 7. As a rechargeable battery 40 is inserted to the charging socket 2, the claws 25 are pushed by the sides 44 and displaced with the arms 24 to the outside. When the rechargeable battery 40 is fully inserted to the charging socket 2, the claws 25 engage the corresponding catch channels 48, thereby controlling the position of the rechargeable battery 40 and preventing the rechargeable battery 40 from dropping out unintentionally. Each claw 25 includes inclined surfaces, as best seen in FIG. 7 and described with respect to FIGS. 2-3. Such inclined surfaces interact with the corresponding catch channel 48 and cause the corresponding arm 24 to flex inwardly or outwardly, thereby permitting the claw 25 to engage with or disengage from the corresponding catch channel 48.

In addition, when the rechargeable battery 40 is inserted to the charging socket 2, the ribs 31 disposed inside the charging socket 2 enter the channels 45, and thus control the distance between the back wall 18 of the charging socket 2 and the back 42 of the rechargeable battery 40. This prevents the rechargeable battery 40 from moving inside the charging socket 2, and assures positive contact between the charging terminals 19 and the surfaces of the battery terminals 41 facing the back 42. Furthermore, because the ribs 31 are guided by the bevels 46 leading into the channels 45 as the rechargeable battery 40 is inserted to the charging socket 2, the rechargeable battery 40 can be installed in the optimum position even when the charging socket 2 is larger than the rechargeable battery 40.

As described above, a rechargeable battery 40 can be easily installed by insertion to a charging socket 2 in a battery charger 1 according to at least one embodiment of the invention, and the charging terminals 19 inside the charging socket 2 are disposed on the downward-facing, inclined back wall 18 of the charging socket 2. As a result, contact between the charging terminals 19 and liquid flowing through the charging socket 2 can be prevented in the event liquid enters the charging socket 2 from the outside. Furthermore, even if liquid is trapped inside the charging socket 2, the liquid can be held in a state that makes contact with the charging terminals 19 difficult. As a result, the battery charger 1 enables easily installing a rechargeable battery 40, and protects the charging terminals 19 from foreign liquid objects. Furthermore, because the back wall 18 of the charging socket 2 is inclined to the vertical, and liquid entering the charging socket 2 flows along the slope of the charging socket 2 and into the bottom 2a, contact between the charging terminals 19 and foreign fluids is even more difficult.

A drain hole 16 is also formed in the bottom 2a of the charging socket 2, and this drain hole 16 is at a position closer to the bottom end of the charging socket 2 than the charging terminals 19, i.e., the drain hole 16 is lower than the charging terminals 19 when the bottom of the case 3 is placed on a horizontal surface. More specifically, the drain hole 16 is formed at the lowest part of the bottom 2a of the charging socket 2. As a result, even if a large amount of liquid enters the charging socket 2, the liquid drains out from the drain hole 16 quickly before contacting the charging terminals 19, and the charging terminals 19 can therefore be more reliably protected.

A drain hole 16 is also opened in the bottom front portion 12b rendering the bottom 2a of the charging socket 2. Liquid entering the charging socket 2 flows easily along the upward-facing slope opposite the back wall 18, and flows down from the bottom back portion 12a to the bottom front portion 12b side. The drain hole 16 is disposed on the bottom front portion 12b in at least one embodiment. In other words, the drain hole 16 is located at the side facing the back wall 18 rather than at the back wall 18 where the charging terminals 19 are disposed. As a result, because liquid entering the charging socket 2 flows out from the drain hole 16 before contacting the charging terminals 19, the charging terminals 19 are more reliably protected from foreign objects.

Furthermore, because a battery holder 4 that has a bottom and forms the charging socket 2 is disposed in the case 3 of the battery charger, a drain hole 16 is formed in the bottom 12 of the battery holder 4, and a collection tray 27 is provided below the drain hole 16, foreign liquid flowing out from the drain hole 16 in the charging socket 2 does not spread below the charging socket 2, soiling the inside of the case 3 of the battery charger 1 is prevented, and components other than the charging terminals 19 can also be protected.

Furthermore, because a bottom drain 28 is formed in the collection tray 27, and a spout 35 that connects the bottom drain 28 to the outside is disposed below the collection tray 27 and extends through the space where the wiring 50 used to charge a rechargeable battery 40 is placed, foreign liquid draining out from the drain hole 16 in the charging socket 2 can be discharged to the outside of the battery charger 1 without spreading below the charging socket 2, and the wiring and the charging terminals 19 can both be protected from foreign objects.

Furthermore, because a displaceable arm 24 with a claw 25 that engages a catch channel 48 formed in the corresponding side of the rechargeable battery 40 is formed in each side wall 22 of the charging socket 2, the rechargeable battery 40 can be accurately positioned by the claws 25 engaging the catch channels 48. In addition, because the arm 24 formed by the slit 23 made in the side wall 22 makes part of the side wall 22 displaceable, the arms 24 do not need to be rendered by members separate from the charging socket 2, thereby improving productivity and reducing cost.

The arms 24 and slits 23 are also disposed higher than the bottom 2a of the charging socket 2. This configuration combined with the location of a drain hole 16 at the lowest part of the bottom 2a of the charging socket 2 prevents liquid from leaking from the slits 23 in the side walls 22.

Furthermore, because a rib 31 that engages a channel 45 formed in the rechargeable battery 40 and assures contact pressure between the charging terminals 19 and the battery terminals 41 of the rechargeable battery 40 is disposed near the charging terminals 19, that is, in the side wall 22 of the charging socket 2 at a position in contact with the bottom back portion 12a, reliable contact can be made between the charging terminals 19 and the battery terminals 41, thus enabling stable charging. The rib 31 could be disposed at a position separated from the bottom 12, but providing the rib 31 near the bottom 12 away from the center of the side wall 22 in this implementation assures more reliable contact between the charging terminals 19 and the battery terminals 41 of the rechargeable battery 40, and is therefore preferable.

A configuration having a drain hole 16 formed in the charging socket 2 is described in the foregoing description, but the disclosure is not limited thereto, and the effect of inhibiting liquid entering the charging socket 2 from contacting the charging terminals 19 can also be achieved in at least one embodiment not having a drain hole 16. The collection tray 27 can also be omitted in a configuration not having a drain hole 16.

The location of the drain hole 16 is also not limited to the description above, and the drain hole 16 could be located near the side walls 22. This also applies to the location of the bottom drain 28.

The case 3 is also described as an assembly of a battery holder frame 5 and a separate battery holder 4, but the battery holder frame 5 and battery holder 4 can be rendered in unison.

The number of charging sockets 2 in the battery charger 1, the configuration of the indicators 6, and other details of the foregoing configuration can obviously also be modified as desired.

It will be apparent that variations to the above specifically described embodiments may be made. Such variations are not to be regarded as a departure from the spirit and scope of the disclosure.

What is claimed is:

1. A battery charger, comprising:
    a battery charger case having a top and a bottom;
    a drain hole opened in the socket at a position lower than the charging terminal when the bottom of the battery charger case is placed on the horizontal surface, and wherein the drain hole is disposed in the lowest part of the bottom of the socket; and
    a socket disposed in the battery charger case, wherein the socket is tubular and has
    a bottom, a top opening through which a rechargeable battery is insertable into the socket, and
    a side wall that extends between the top opening and the bottom and is a slope inclined to the vertical when the bottom of the battery charger case is placed on a horizontal surface; and
    a charging terminal disposed on the slope.

2. The battery charger of claim 1, further comprising:
    a receptacle disposed inside the battery charger case and below the drain hole which is formed in the bottom of the socket.

3. The battery charger of claim 2, wherein:
a further drain hole is formed in the receptacle; and
the battery charger further comprises a drain spout that communicates the further drain hole in the receptacle with the outside of the battery charger case and is disposed below the receptacle and extends through a space where wiring for charging the rechargeable battery is disposed.

4. The battery charger of claim 3, wherein the drain hole of the socket is not aligned with the drain spout.

5. The battery charger of claim 1, further comprising:
a rib disposed on a further side wall of the socket;
wherein the rib is configured to engage a channel formed in the rechargeable battery to assure contact pressure between the charging terminal of the battery charger and a corresponding charging terminal of the rechargeable battery.

6. The battery charger of claim 5, wherein the rib extends parallel to the side wall on which the charging terminal is disposed.

7. The battery charger of claim 1, wherein
the bottom of the socket is also a slope inclined to the vertical when the bottom of the battery charger case is placed on a horizontal surface, and
the slope of the bottom is less steep than the slope of the side wall on which the charging terminal is disposed.

8. The battery charger of claim 1, wherein, when the bottom of the battery charger case is placed on a horizontal surface, the top opening is completely above the charging terminal.

9. The battery charger of claim 1, further comprising:
an arm formed on a further side wall of the socket by a slit in the further side wall,
wherein the slit is disposed higher than the bottom of the socket.

10. A charging terminal structure of a battery charger, comprising:
a drain hole opened in the socket at a position lower than the charging terminal when the bottom of the battery charger case is placed on the horizontal surface, and
wherein the drain hole is disposed in the lowest part of the bottom of the socket; and
a socket configured to be disposed in a battery charger case having a top and a bottom, wherein the socket is tubular and has
a bottom,
a top opening through which a rechargeable battery is insertable into the socket, and
a side wall that extends between the top opening and the bottom and is a slope inclined to the vertical when the bottom of the battery charger case is placed on a horizontal surface; and
a charging terminal disposed on the slope.

11. The charging terminal structure of claim 10, further comprising:
a drain hole opened in the socket at a position lower than the charging terminal when the bottom of the battery charger case is placed on the horizontal surface.

12. The charging terminal structure of claim 11, wherein:
the drain hole is disposed in the lowest part of the bottom of the socket.

13. The charging terminal structure of claim 10, further comprising:
a rib disposed on a further side wall of the socket;
wherein the rib is configured to engage a channel formed in the rechargeable battery to assure contact pressure between the charging terminal of the battery charger and a corresponding charging terminal of the rechargeable battery, and
wherein the rib extends parallel to the side wall on which the charging terminal is disposed.

14. The charging terminal structure of claim 10, wherein
the bottom of the socket is also a slope inclined to the vertical when the bottom of the battery charger case is placed on a horizontal surface, and
the slope of the bottom is less steep than the slope of the side wall on which the charging terminal is disposed.

15. The charging terminal structure of claim 10, wherein, when the bottom of the battery charger case is placed on a horizontal surface, the top opening is completely above the charging terminal.

16. A battery charger, comprising:
a battery charger case having a top and a bottom, wherein the top includes a plurality of inclined steps; and
a drain hole opened in the socket at a position lower than the charging terminal when the bottom of the battery charger case is placed on the horizontal surface, and
wherein the drain hole is disposed in the lowest part of the bottom of the socket; and
a plurality of sockets disposed in the battery charger case, wherein each of the sockets has
a bottom,
a top opening which is formed at a corresponding one of the inclined steps and through which a rechargeable battery is insertable into the socket,
a side wall that extends between the top opening and the bottom and is a slope inclined to the vertical when the bottom of the battery charger case is placed on a horizontal surface, and
a charging terminal disposed on the slope.

17. The battery charger of claim 16, wherein each of the sockets further comprises:
a drain hole opened in the socket at a position lower than the charging terminal when the bottom of the battery charger case is placed on the horizontal surface.

18. The battery charger of claim 17, further comprising:
a plurality of receptacles corresponding to the sockets, each of the receptacles disposed inside the battery charger case and below the drain hole which is formed in the bottom of the corresponding socket,
wherein the receptacles have dividers dividing an inside of the battery charger case into separated portions to prevent liquid under one of the sockets from spreading to a space below the other sockets.

* * * * *